(12) United States Patent
Hurwitz et al.

(10) Patent No.: US 12,537,362 B2
(45) Date of Patent: Jan. 27, 2026

(54) MANAGING OPTICAL POWER IN LASER SYSTEM

(71) Applicant: Analog Devices International Unlimited Company, Limerick (IE)

(72) Inventors: Jonathan Ephraim David Hurwitz, Edinburgh (GB); Maurizio Zecchini, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 652 days.

(21) Appl. No.: 17/995,693

(22) PCT Filed: Apr. 6, 2021

(86) PCT No.: PCT/EP2021/058962
§ 371 (c)(1),
(2) Date: Oct. 6, 2022

(87) PCT Pub. No.: WO2021/204816
PCT Pub. Date: Oct. 14, 2021

(65) Prior Publication Data
US 2023/0134679 A1 May 4, 2023

Related U.S. Application Data

(60) Provisional application No. 63/005,748, filed on Apr. 6, 2020.

(51) Int. Cl.
*H01S 5/0683* (2006.01)
*H01S 3/13* (2006.01)
(Continued)

(52) U.S. Cl.
CPC .......... *H01S 5/0683* (2013.01); *H01S 3/1305* (2013.01); *H01S 5/0428* (2013.01);
(Continued)

(58) Field of Classification Search
CPC .. H01S 3/1305; H01S 5/0683; H01S 5/06804; H01S 5/0608; H01S 5/06216; H01S 5/0428
See application file for complete search history.

(56) References Cited

U.S. PATENT DOCUMENTS 5,844,928 A 12/1998 Shastri et al.
6,587,490 B2 * 7/2003 Crawford ................ H01S 5/042
372/38.07
(Continued)

FOREIGN PATENT DOCUMENTS

CN 104111462 10/2014
CN 104682190 6/2015
(Continued)

OTHER PUBLICATIONS

"International Application Serial No. PCT/EP2021/058962, International Search Report mailed Jul. 9, 2021", 3 pgs.
(Continued)

*Primary Examiner* — James A Menefee
(74) *Attorney, Agent, or Firm* — Schwegman Lundberg & Woessner, P.A.

(57) ABSTRACT

A device for managing power of a laser source in a laser-based apparatus includes switched-mode power controller circuitry. The power controller circuitry further includes a controller output configured to be coupled to reservoir capacitor of a laser source to provide a first mode of regulating charging of the reservoir capacitor between illuminations of the laser source and a second mode of regulating charging of the reservoir capacitor during illuminations of the laser source.

22 Claims, 14 Drawing Sheets

(51) Int. Cl.
*H01S 5/042* (2006.01)
*H01S 5/06* (2006.01)
*H01S 5/062* (2006.01)
*G01S 17/06* (2006.01)

(52) U.S. Cl.
CPC .......... *H01S 5/06216* (2013.01); *G01S 17/06* (2013.01); *H01S 5/0617* (2013.01)

(56) References Cited

U.S. PATENT DOCUMENTS

| | | |
|---|---|---|
| 6,836,493 B2 | 12/2004 | Mahowald et al. |
| 7,202,941 B2 | 4/2007 | Munro |
| 7,236,507 B2 | 6/2007 | Stewart et al. |
| 7,269,191 B2 | 9/2007 | Stewart et al. |
| 7,270,490 B2 | 9/2007 | Guenter et al. |
| 7,295,592 B2 | 11/2007 | Morimoto et al. |
| 7,302,186 B2 | 11/2007 | Light et al. |
| 7,515,619 B2 | 4/2009 | Juluri |
| 7,655,895 B2 | 2/2010 | Breed |
| 7,737,643 B2 | 6/2010 | Lys |
| 7,845,823 B2 | 12/2010 | Mueller et al. |
| 7,965,277 B2 | 6/2011 | Ooi et al. |
| 8,531,131 B2 | 9/2013 | Lekatsas et al. |
| 8,659,237 B2 | 2/2014 | Archenhold |
| 8,723,149 B2 | 5/2014 | Svajda et al. |
| 8,733,659 B2 | 5/2014 | Giebel et al. |
| 9,031,103 B2 | 5/2015 | Castillo et al. |
| 9,059,562 B2 | 6/2015 | Priest et al. |
| 9,295,112 B2 | 3/2016 | Knapp |
| 9,368,936 B1* | 6/2016 | Lenius .................... G01S 7/484 |
| 10,481,268 B2 | 11/2019 | Vlaiko et al. |
| 10,511,142 B2 | 12/2019 | Crawford et al. |
| 2008/0018261 A1 | 1/2008 | Kastner |
| 2011/0085576 A1 | 4/2011 | Crawford et al. |
| 2012/0299480 A1 | 11/2012 | Peting et al. |
| 2015/0305127 A1* | 10/2015 | Yem ...................... H01S 5/0683 372/38.01 |
| 2018/0188360 A1* | 7/2018 | Berger .................... G01S 7/497 |
| 2019/0221997 A1 | 7/2019 | Johnson et al. |
| 2019/0229493 A1* | 7/2019 | Stern ...................... H01S 5/0428 |
| 2019/0296522 A1 | 9/2019 | Johnson et al. |
| 2020/0052466 A1 | 2/2020 | Chen et al. |
| 2020/0096642 A1 | 3/2020 | Pei et al. |
| 2020/0174124 A1 | 6/2020 | Raring et al. |
| 2020/0274320 A1* | 8/2020 | Inada .................... G01S 7/4815 |
| 2021/0243866 A1* | 8/2021 | Mueller .............. H05B 45/327 |

FOREIGN PATENT DOCUMENTS

| | | |
|---|---|---|
| WO | WO-2015140789 A1 | 9/2015 |
| WO | WO-2017003681 A1 | 1/2017 |
| WO | WO-2018125825 A1 | 7/2018 |
| WO | WO-2021204816 A1 | 10/2021 |

OTHER PUBLICATIONS

"International Application Serial No. PCT/EP2021/058962, Written Opinion mailed Jul. 9, 2021", 9 pgs.

"M02171: 11.3Gbps Dual Loop VCSEL Driver with Integrated Micro Controller", Mindspeed Technologies Data Sheet, (Dec. 2010), 49 pgs.

"TPS99000-Q1 System Management and Illumination Controller", Texas Instruments, (Apr. 2019), 83 pgs.

"Chinese Application Serial No. 202180031599.3, Response filed May 27, 2025 to Decision of Rejection mailed Feb. 27, 2025", w/ English Claims, 21 pgs.

"International Application Serial No. PCT/EP2021/058962, International Preliminary Report on Patentability mailed Oct. 20, 2022", 11 pgs.

"Chinese Application Serial No. 202180031599.3, Office Action mailed May 24, 2024", w/ English translation, 12 pgs.

"Chinese Application Serial No. 202180031599.3, Response filed Sep. 24, 2024 to Office Action mailed May 24, 2024", w English claims, 17 pgs.

"Chinese Application Serial No. 202180031599.3, Office Action mailed Nov. 11, 2024", w/ English translation, 21 pgs.

"Chinese Application Serial No. 202180031599.3, Response filed Jan. 13, 2025 to Office Action mailed Nov. 11, 2024", w/ English Claims, 18 pgs.

"Chinese Application Serial No. 202180031599.3, Decision of Rejection mailed Feb. 27, 2025", w/ English machine translation, 18 pgs.

* cited by examiner

MANAGING OPTICAL POWER IN LASER SYSTEM

CLAIM OF PRIORITY

This patent application is a National Stage of PCT Application Serial Number PCT/EP2021/058962, entitled "MANAGING OPTICAL POWER IN LASER SYSTEM," filed Apr. 6, 2021 and published as WO 2021/204816 A1, on Oct. 14, 2021, which claims the benefit of priority of U.S. Provisional Patent Application Ser. No. 63/005,748, entitled "SAFE DELIVERY OF OPTICAL POWER IN TIME OF FLIGHT OR OTHER LASER SYSTEM," filed on Apr. 6, 2020, which are hereby incorporated by reference herein in their entirety.

TECHNICAL FIELD

This document pertains generally, but not by way of limitation, to energy management of laser systems including for Time of Flight (ToF) systems (e.g., for range-finding or determining position or shape of an object).

BACKGROUND

Laser energy can be used in optical systems for many purposes. One such purchase is for determining a distance to or a depth of a target object using such systems as Time of Flight (ToF) or LIDAR. These systems have can draw large amounts of power at different times during use but do not necessarily need those large power draws during sustained uses of the system.

SUMMARY

Therefore, the present inventors have recognized that, among other things, the ability to control the energy use of the system is needed and, in some cases, precise control of the energy use of the system would be desired by the user of the system.

Timing alignment can help manage energy use in a system for determining 3D position or shape of one or more objects. In direct and indirect TOF systems, it power can be drawn in impulses. For example, the target object or scene can be illuminated in short bursts of light. A responsive light signal can be detected at the receive side of the TOF system. The detected light signal can be integrated for the duration of the light burst. The detected signal can be based on the photons that are received by a sensor or an imagining array of photosensors acting as the receiver. The illumination light bursts can emitted in a series of short pulses. The time between illumination light bursts can be nanoseconds between each burst of light. The system can be set to a particular modulation frequency for the illumination light bursts. This modulation frequency can vary from a range of 10 megahertz to $100^{th}$ megahertz. At times, high power is needed at the beginning of the series of illumination pulses but that high power draw is not needed for the full duration of the illumination pulse. Therefore, being able to accurately determine the power usage of the illumination laser or light source can help determine and modulate later power usage. This can help ensure or improve 3D capture of information about the one or more target objects or scenes.

This document describes, among other things, a technique for controlling the charging and discharging characteristics of a capacitor used in regulating and the managing power of a laser source in a laser-based apparatus, such as can be used to help improve overall system performance of a TOF or other system. The system or methods can be compatible with one or more of Pulsed-Mode or Continuous Wave TOF systems, Direct Time of Flight (DTOF), and Indirect Time Of Flight (ITOF) systems An illustrative, non-limiting numbered list of various aspects of the present disclosure is provided below.

Aspect 1 can include or use subject matter (such as an apparatus, a system, a device, a method, a means for performing acts, or a device readable medium including instructions that, when performed by the device, can cause the device to perform acts, or an article of manufacture), such as can include or use the limiting the charge and monitor the discharge of a reservoir capacitor, such that the amount of energy delivered can be limited and over delivery or under delivery of power from the cap to the laser can be used for system diagnostics. The monitoring the voltage of the cap to reflect is reflected by the $CV^2$ characteristic of the capacitor that is used and allows for fuel gauge capability of the capacitor.

Aspect 2 can include or use, or can optionally be combined with the subject matter of Aspect 1, to optionally include or use the detection of a fault in the system can lead to a discharge of the reservoir capacitor.

Aspect 3 can include or use, or can optionally be combined with the subject matter of any of Aspects 1-2, to include optional a non-volatile means to prevent the reservoir capacitor from being recharged.

Aspect 4 can include or use, or can optionally be combined with the subject matter of any of Aspects 1-3, to optionally include or use, the fault indication including a measure of optical output and/or temperature to understand a fault condition.

Aspect 5 can include or use, or can optionally be combined with the subject matter of any of Aspects 1-4, to include the reservoir capacitor discharge characteristics can be checked using at least one known currents source (or other known discharge method) to then linearise and calibrate the 'fuel gauge' monitor.

Aspect 6 can include or use, or can optionally be combined with the subject matter of any of Aspects 1-5, to include the same inductor used in a buck switched mode regulator and a boost switch mode regulator that is repurposed for the purpose of charging and discharging the reservoir capacitor.

Aspect 7 can include or use, or can optionally be combined with the subject matter of any of Aspects 1-6, to include using a buck boost regulator the purpose of for boosting to charge the reservoir capacitor as bucking for delivering power to the laser.

Aspect 8 can include or use, or can optionally be combined with the subject matter of any of Aspects 1-7, to include using a charge pump to charge reservoir capacitor and buck or buck-boostswitch mode voltage regulator to discharge the reservoir capacitor.

Aspect 9 can include or use, or can optionally be combined with the subject matter of any of Aspects 1-8, to option that the reservoir capacitor could be lower than the voltage to be delivered to the laser and we boost to deliver the current Aspect 10 can include or use or can optionally be combined with the subject matter of any of Aspects 1-9, to include sending a signal prior to the laser burst the desired output voltage can be elevated slightly, to allow for the initial transient and allow the DC_Dc converter time to respond. Reducing the need to have a large capacitor on the output node Aspect 11 can include or use, or can optionally be combined with the subject matter of any of Aspects 1-10, to include a system can be used for the peak power need or combined to make a joint power spreading system in which case separating fuel gauge characteristics of the on board imager circuit or laser source may be needed.

Aspect 12 can include or use, or can optionally be combined with the subject matter of any of Aspects 1-11, to include parameters for different frequencies of operation can be stored and used to enable different transient and power responses due to potentially different I vs F responses.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, that a problem to be solved in time of flight (ToF) and other laser systems is how such a system can efficiently manage the energy used for the illumination by the laser.

Lack of active monitoring of laser output optical energy or power in a particular laser-based system can over-constrain and limit the capabilities of such a system. Indirect optical power measurement can be used, such as where a good correlation between the measured indirect indication of laser output optical power and the actual laser optical power can be characterized, calibrated, or both. Often the system does not need a constant amount of power and in fact has a has large power draw or an increase in power to be supplied over a short period of time. For example the laser driver or sensor demodulation clock can draw triple the average current at the start of an illumination cycle or the first illumination pulse of a series of illumination pulses then it does to maintain to illumination over a period of time. The control of this amount of power can be done in an automatic manner using a reservoir capacitor. Determining when to either charge the reservoir capacitor or draw excess power from the reservoir capacitor can be done by determining the state of the system using the indirect optical power measurements. This gives a soft-start capability to the laser system that can minimize in-rush for initial charge and current limit on recharge.

Accordingly, this document describes, among other things, systems and methods for controlling optical power in a ToF or other laser-based system. This can include controlling power delivery of a Vertical Cavity Surface Emitting Laser (VCSEL) or other laser-based ToF or other system, such as to help keep such a system operating in eye-safe conditions. This can include, among other things, providing a stand-alone power control integrated circuit (IC) such as can set and measure the energy delivered to the VCSEL or other laser. The power control IC can control a laser driver, such as can include a field-effect transistor (FET) or a dedicated Laser VCSEL driver. The driver can be included in or used with an external illumination module. The present techniques can also include controlling and measuring an indication of the optical energy or optical power delivered by the VCSEL or other laser. The power control and laser driver circuitry can be integrated in a single IC chip solution, such as can be used with an external illumination module. Power circuitry, laser driver circuitry, and illumination circuitry can also be integrated in on the same module. The present techniques for power control can use either optical or electrical information such to determine or appropriately control the power output.

Figure 1:
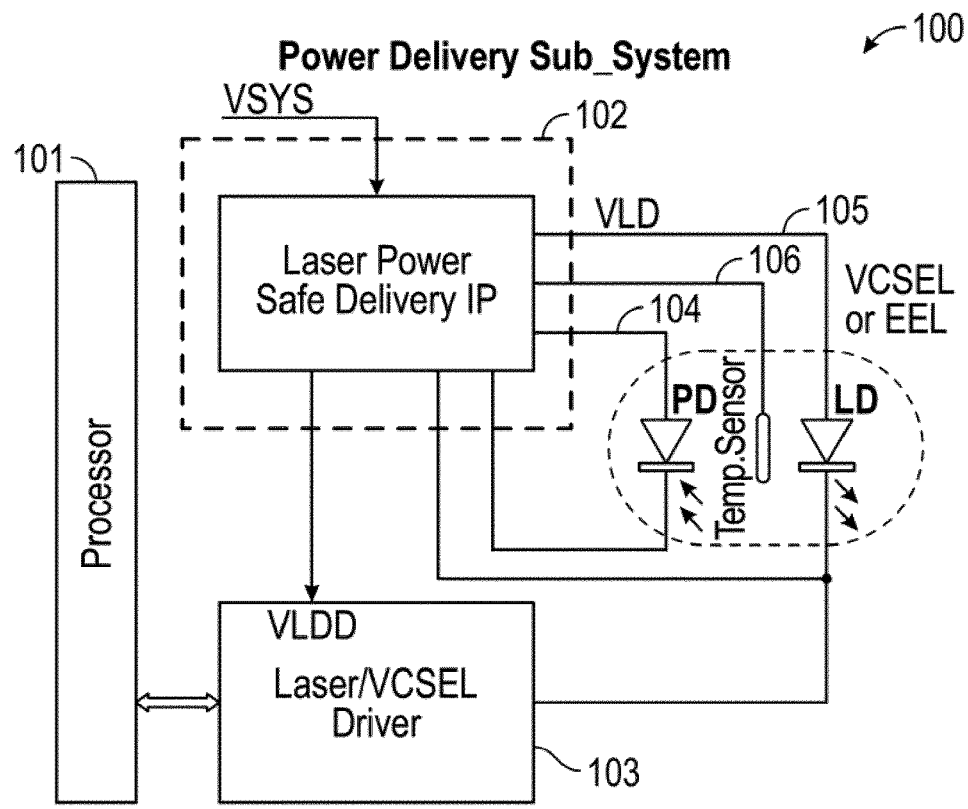
FIG. 1: An example of a block diagram of a power delivery subsystem.

FIG. 1 shows an example of a block diagram of a power delivery subsystem 100 such as can be used to provide an illumination ToF solution based on a stand-alone power delivery arrangement. The power delivery subsystem can include a processor circuit 101. The processor 101 can include a system application processor circuit such as to set a target energy operating parameter or one or more other operating parameters, or both. The laser power delivery system 102 can include an arrangement in which the safe energy delivery power implementation can be programmed by the processor 101, such as for measuring an indication of the emitted averaged optical power. The emitted averaged (or other central tendency) of optical power can be detected by an optical power measurement device or sensor 104. The measurement can be used for control, such as to set a maximum allowed power delivery for subsequent cycles. The measuring device or sensor 104 can include a photodetector or an array of photodetectors. The sensor 104 can be used for measuring the optical power delivered by the Laser/VCSEL 105. The Laser/VCSEL 105 can also be referred to as a light emitter or as an illumination source or laser source or laser diode. The laser source 105 can include an Edge Emitting Diode Laser (EEL) a Vertical-Cavity Surface-Emitting Laser (VCSEL), or other light emitter such as for use in a ToF system such as can be operated at a near infrared (NIR) or infrared (IR) wavelength. The illuminating laser diode 105 can be coupled to the laser/VCSEL driver 103. The Laser/VCSEL driver 103 can be operated in one or multiple different modes, such as in a pulsed or continuous wave (CW) mode. The driver can include an N-Channel Field Effect Transistor (NFET) or other Field Effect Transistor (FET) that can act as a switch or switched current source for the driver.

Optionally, this arrangement can also include a sensor 104, 106 such as for detecting at least one of the temperature or forward voltage for the laser diode 105, such as can help provide a more precise estimate of needed power. Using a thermal or other sensor can help infer the optical power indirectly. By using a sensor 104 for measuring the laser diode forward voltage (VF), the optical power can be inferred without requiring a photodetector sensor 106. For example, laser temperature can be inferred by measuring the laser diode forward voltage VF, such as after characterization or calibration of the relationship between the forward voltage and the laser diode temperature. The sensor 106 can include an optional temperature sensor thermally coupled with the light emitter element 105. Laser optical power can be highly dependent on the laser temperature. Thus, laser temperature can provide useful information such as can be used to control laser output. Such laser output control can help achieve higher accuracy for efficient power management and regulating the laser system. Other benefits can include helping a laser safety system.

Figure 2:
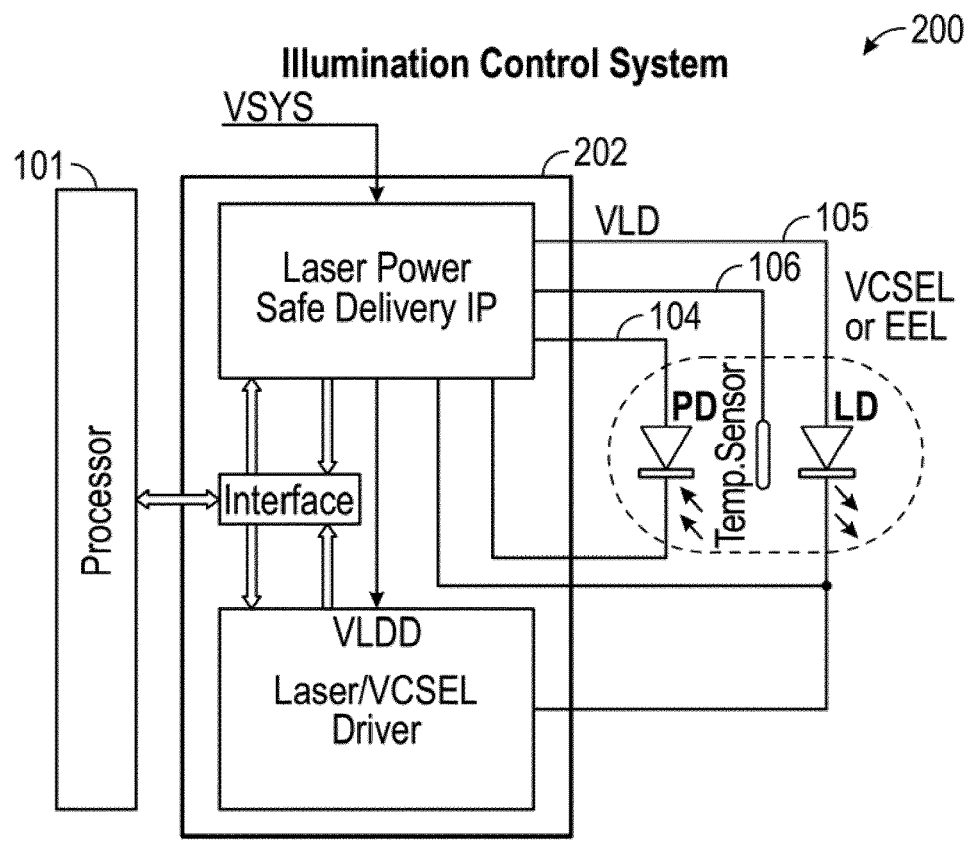
FIG. 2: An example of a block diagram of a partially integrated illumination control system.

FIG. 2 shows an example of a block diagram of an example of a partially integrated illumination control system 200 that can integrate the power control system and the and laser driver componentry. The integrated system 202 interfaces with the processor and as such can be efficiently programmed by the processor 201. The system can measure the emitted average optical power or optical energy detected by the sensor 104 such as to efficiently determine the maximum allowed optical power delivery and, based thereon, to accordingly control the laser driver in the integrated system 202 for subsequent cycles. Optionally, the system 202 can detect the temperature of the laser diode 105 using a separate sensor 106 or by indirect measurement using a sensor 104, such as using a temperature sensor other than a photodetector. For example, the forward voltage for the laser diode 105 can be used to provide a temperature indication, which, in turn, can be used to help provide a more precise estimation for the required power to operate the laser diode 105.

Figure 3:
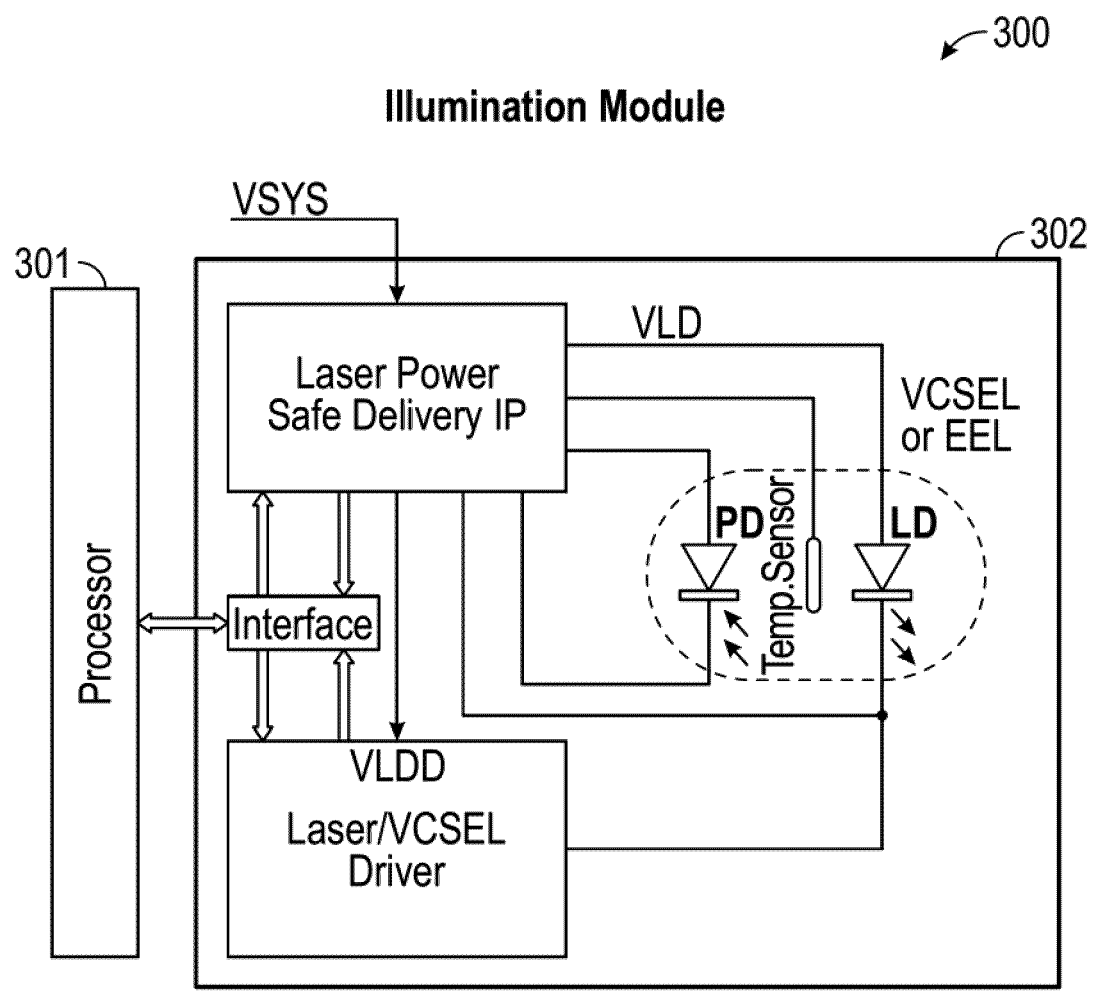
FIG. 3: An example of a block diagram of a fully integrated illumination TOF module.

FIG. 3 shows an example of a block diagram of an example of a fully integrated TOF illumination module 300 such as can include integrated power control circuitry, laser driver circuitry, and illumination source such as an EEL/VCSEL. The processor 301 can include a system application processor such as can be operated using encoded instructions to set a target optical energy or power parameter or one or more other operating parameters. The integrated system 302 can include an energy delivery circuit and laser driver system with integrated illumination. The processor 301 can be programmed to control the system 302 to measure the emitted average optical power, such as can be detected by an integrated photodetector. The measured emitted average optical power can be used to set the maximum allowed optical power delivery via an appropriate laser driver current, such as for one or more subsequent cycles. Additionally or alternatively, the system 302 can be configured to detect the laser temperature directly or indirectly, such as by measuring the laser diode forward voltage of the EEL/VCSEL included in the illumination module 300. This can be used to help allow more precise estimation of the optical power provided by the laser diode or to help control the electrical power used by the laser diode. The laser power safe delivery module can optionally include a photodetector, such as can be optically coupled with the EEL/VCSEL, such as for measuring the optical power delivered by the light emitter. In some implementations, optical power can be inferred indirectly by use of laser temperature. The laser temperature can be obtained indirectly, such as by measuring or determining the laser diode forward voltage VF. An optional temperature sensor, such as can be coupled with the laser, can be additionally or alternatively be used to help directly measure the EEL/VCSEL or other laser temperature. Such direct or indirect laser temperature information can be useful, such as to help achieve higher accuracy or to control the power delivery to the laser (or to control cooling of the laser, such as using a ThermoElectric Cooler) such as to help inhibit or prevent unsafe operating conditions or premature component failure and maintains optimal power delivery for the system. For example, laser temperature can be inferred, such as by measuring the laser diode forward voltage and applying a characterization or calibration factor or function, such as can be used for relating the laser diode forward voltage to laser temperature.

Figure 4:
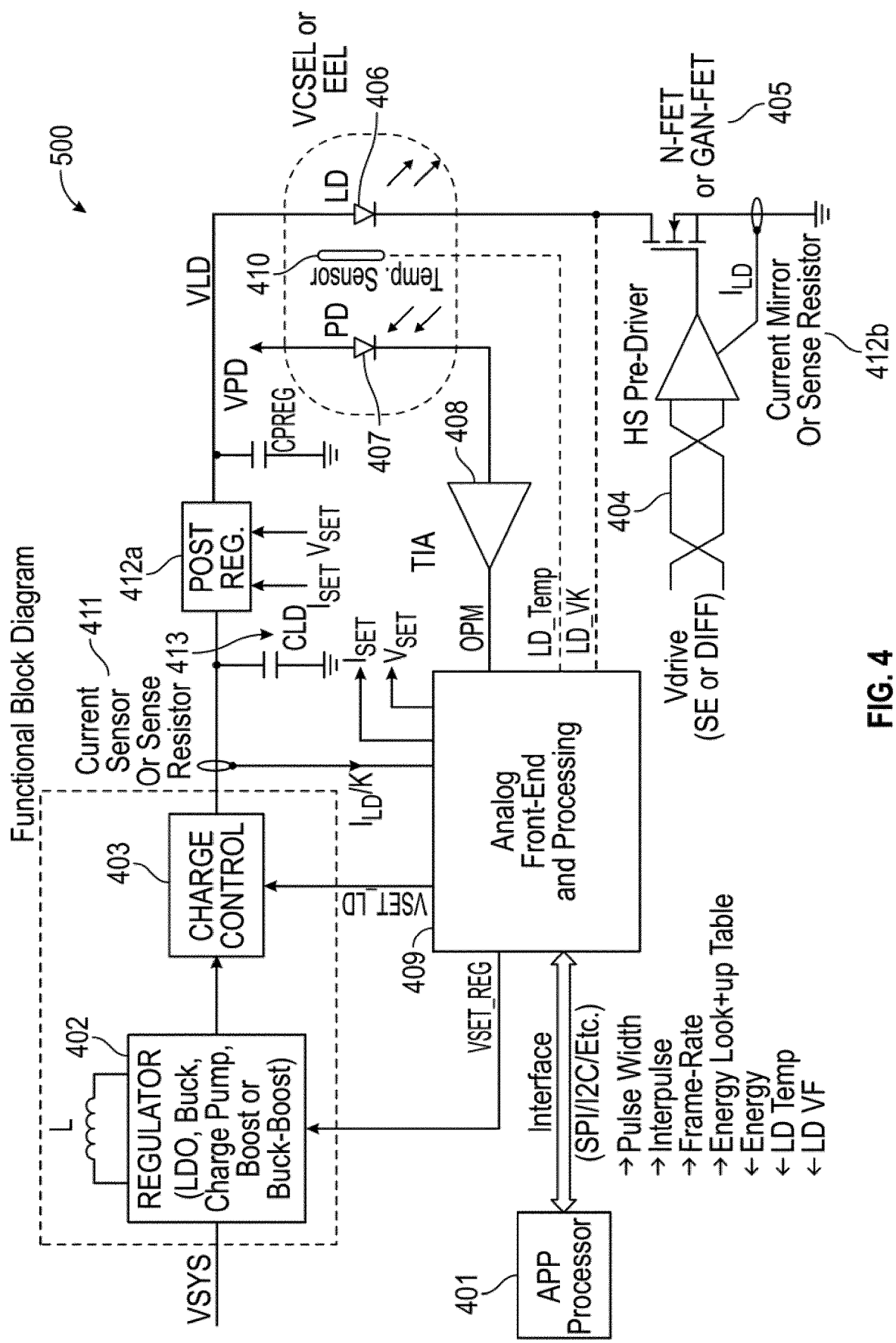
FIG. 4: Illustrates a functional block diagram.

FIG. 4 shows an example of a functional block diagram 400 shown, such as with which a safe energy control technique can be applied.

The application processor 401 can perform a diagnostic cycle such as to monitor the state-of-health of the illumination system. This can involve issuing a brief light pulse by the laser diode, such as during which the laser forward voltage can be measured at an optimal power level. This laser diode forward voltage information can be used to control adjusting one or more energy delivery parameters for the desired operating conditions (e.g., frame-rate, modulation/pulse-width, range, etc.).

The application processor 401 can provide a characterization relationship, e.g., a look-up table, such as for use by the power control 409. The look-up table can include information specifying the desired target laser energy delivery such as at different temperatures or other operating conditions.

The power control 409 can set the initial regulation voltage using the regulator 402 to support the desired power for supporting the laser source For efficiency, the voltage regulation can include using a switching voltage regulator e.g., Buck, Boost, Buck-Boost or Charge-Pump) such as can depend on the system supply voltage (VSYS), the desired energy and the forward voltage $V_F$ of the laser diode. The power control 409 can also set the charge control circuit 403 to charge the capacitor $C_{LD}$ 413 between issued laser light illumination pulses. An ultra-low-dropout regulator 412a, such as can be used in alternative to a current controlled laser driver 412b, can help ensure that the power delivered to the EEL/VCSEL laser diode is constant across time.

In applications using a current controlled laser driver 412b, the processor 401 can set the desired current limit for 405, in this type of implementation the ultra-low-dropout regulator 412a can be redundant and can be bypassed.

The application processor 401 can send a modulation signal or activation pluses to the high-speed driver 404.

IR or other illumination light can be emitted by the EEL/VCSEL 506, a small portion of which can be directed to the photodetector 507, an output electrical signal of which can be amplified such as by a transimpedance amplifier 508.

The amplified photodetector signal can be integrated over a time period. At the end of the integration time period, an Analog Front End (AFE) block included in the power control 409 can be used to normalize the measured energy such as to correct for a temperature gradient.

Based on the data programmed in the look-up table, the AFE in the power control 409 can update the regulator 402 to control the voltage level needed to support the new energy limit, such as for the next integration cycle, and can set the new energy limit in the charge control block 403. Optionally, a post-regulator 412a, which takes in an input voltage Iset and input voltage Vset to make an adjustment to the power sent to the laser source 406. The use of the post-regulator that is set by using feedback from the AFE in the power control 409 can be used to help ensure constant power delivery across pulses. This can be useful in CW modulation schemes but in pulsed mode TOF this may not be needed as much. When a constant current driver 412b is used, the post-regulator 412a may be redundant.

Optionally, the AFE in the power control 409 can monitor the electrical energy delivered to the illumination circuit such as by sensing voltage and current delivered at node 411. Such an implementation can augment or replace the optical energy measured, such as where good correlation between electrical and optical power exists or can be made available such as through characterization and calibration.

Optionally, the AFE block in the power control 409 can set a new current limit for the laser driver 405 for the next integration period.

To help improve the system safety, the AFE in the power control 409 can monitor one or more conditions such as a laser driver short-circuit, abnormal energy consumption, high laser diode temperature, or temporal activation (e.g., laser active for longer than a programmed time limit in a time window).

Figure 5:
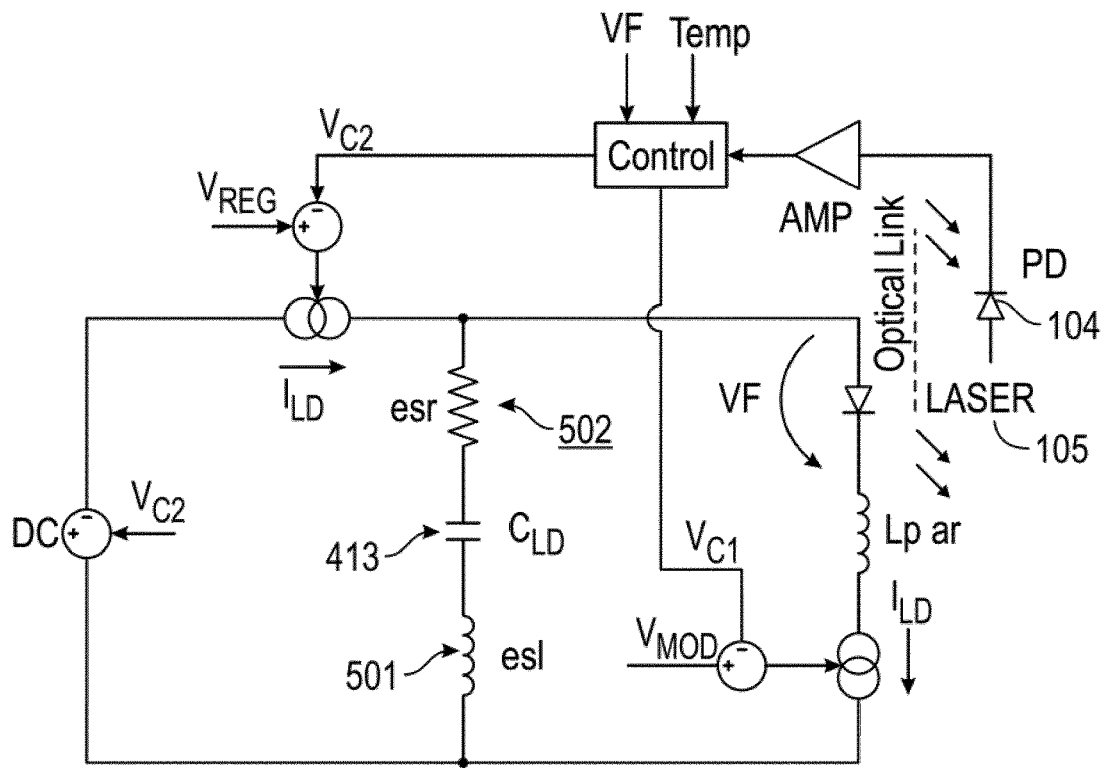
FIG. 5: An example of control loops used by the system.

FIG. 5 shows an example in which one or more control loops can be used. In an example, there can be up to three control loops: (1) a supply voltage regulation loop; (2) a capacitor charge regulation loop; (3) a laser constant current regulation loop, or a combination of these.

In the supply voltage regulation loop, the maximum CLD 413 charging voltage can be regulated.

In the capacitor charge regulation loop, a regulated constant current can be used for charging the capacitor between laser pulse emissions.

In the laser constant current regulation loop, a regulated constant laser diode driver current can be established for driving the EEl/VCSEL or other laser diode.

In some implementations, the constant current generator can be replaced by a switch, and current can be limited to a specified value, such as by the CLD 413 and recharge circuit.

In some instances, the laser driver current can be set by the post-regulator 412a.

One or more of these control loops can depend on one or combination of: measured optical power, EEL/VCSEL forward voltage, or EEL/VCSEL temperature.

Figure 6:
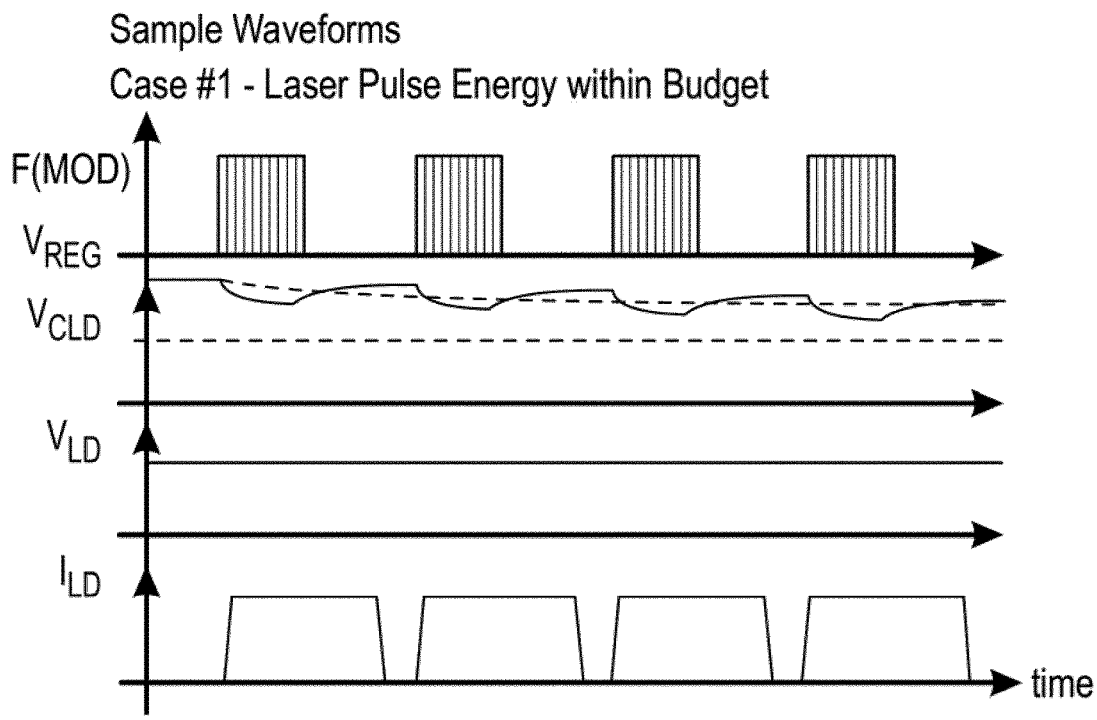
FIG. 6: An example waveform diagram for when the laser pulse energy is within the specified energy budget as set by the system.
Figure 7:
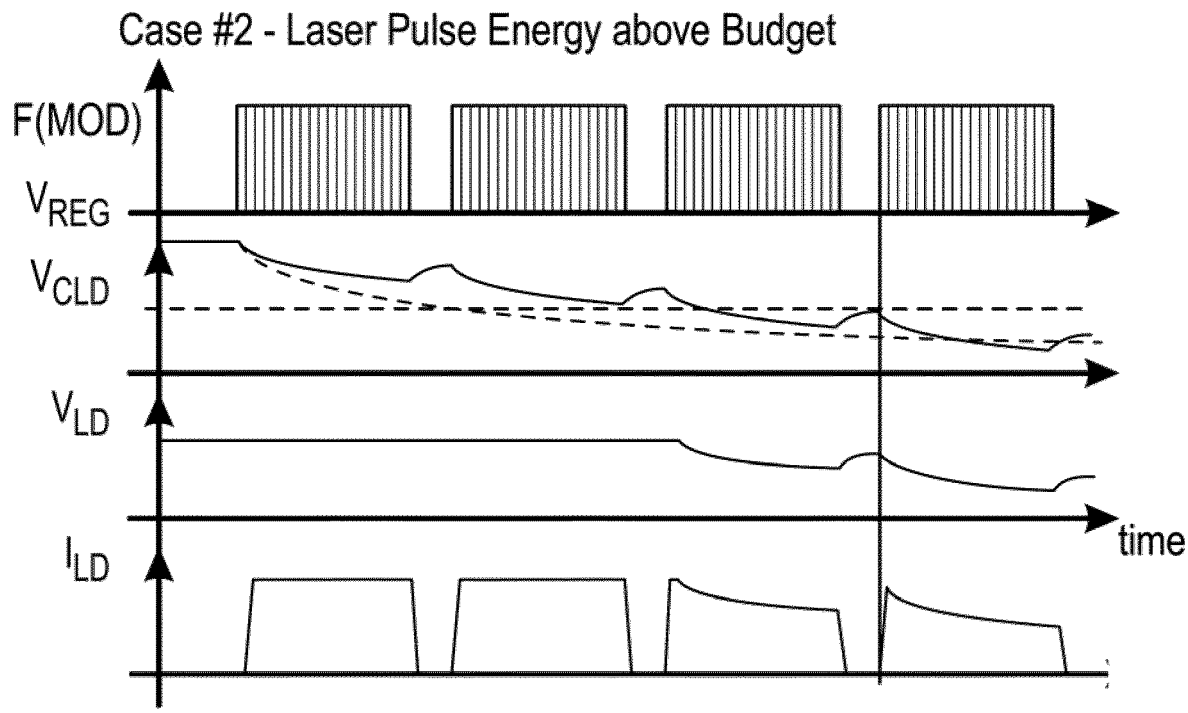
FIG. 7: An example waveform diagram for when the laser pulse energy is above the energy budget as set by the system.

FIGS. 6 and 7 illustrate examples of laser bulk capacitor considerations by showing sampling waveforms under different conditions. Small duty cycle of high power operation, allows large output current to be turned into a small input current.

FIG. 6 shows an example of a waveform diagram for when the laser pulse energy is within the specified energy budget as set by the system. The laser diver current is modulated to satisfy the budgeted usage.

FIG. 7 shows an example of a waveform diagram for when the laser pulse energy is within above the energy budget as set by the system. The laser diver current can be modulated to satisfy the usage.

The VCSEL/Laser may be modulated at high frequencies. For example, the system may be run at a modulation frequency of 10 MHz or greater. Most of the electrical peak energy for the VCSEL/Laser can be delivered via a bulk capacitor such as the capacitor $C_{LD}$ 413 shown, because the other regulator loop or loops may not be fast enough for this type of application. To decrease or minimize the capacitance value and capacitor size of $C_{LD}$ 413, the capacitor voltage across the capacitor CLD 413 can be allowed to drop, such as while continuing to service or maintain the desired laser current delivered to the VCSEL/Laser.

Monitoring $C_{LD}$ 413 during discharging, recharging, or both can be helpful, such as to estimate whether the capacitor $C_{LD}$ 413 can deliver the desired energy to the VCSEL/Laser for subsequent laser activation pulses. Such information can be useful to determine whether one or more parameters should be adjusted for the charging phase of the capacitor $C_{LD}$ 413. Monitoring $C_{LD}$ 413 during discharging, recharging, or both can also help provide a "State of Health" monitoring, such as can help identify or determine whether any issues exist with the capacitor $C_{LD}$ 413, the laser driver circuit, the laser, or a control loop, such as may be due to one or more of component aging, operating temperature, or component failure.

Appropriate selection of the capacitor $C_{LD}$ 413 can help performance when operating at high frequencies, because performance can be impacted by parasitic behavior, such as the capacitor equivalent series resistance (ESR), which can affect energy delivery to the VCSEL/Laser.

Figure 8:
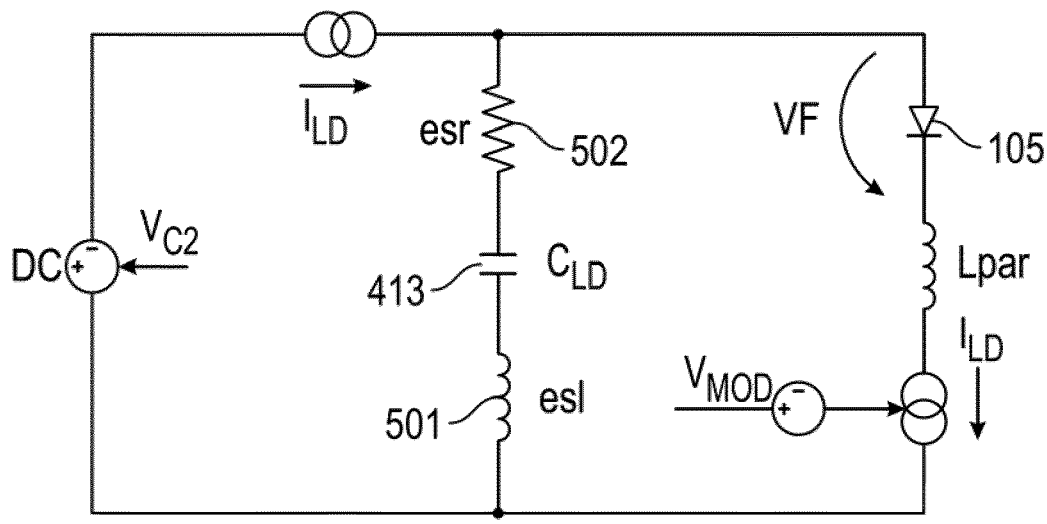
FIG. 8: An example of an implementation of a ToF laser energy delivery equivalent circuit.

FIG. 8 shows an example of an implementation of a ToF laser energy delivery equivalent circuit. In FIG. 8, the capacitor $C_{LD}$ 413 can be charged by a regulation circuit, such as can provide a programmable voltage VLA, a programmable current $I_{CHRG}$, or both. The capacitor $C_{LD}$ 413 can be discharged when the VCSEL/EEL or other laser. This can be represented in FIG. 8 by a laser diode 105 having a forward voltage VF, a parasitic inductance Lpar, and a voltage-modulated current source drawing a current $I_{LD}$. The programmable current $I_{CHRG}$ can be activated during the laser illumination period. The laser illumination period can be short, such as having a duration that can be in the range of 10 to 100 nanoseconds. In some examples the illumination period is in the range of 10 to 100 microseconds. The equivalent circuit of FIG. 8 also shows parasitic elements for the capacitor CLD 413 (e.g., ESR 501, ESL 502) and for the laser and laser driver (e.g., Lpar, such as can be due to bond wires, interconnections, or the like).

Figure 9:
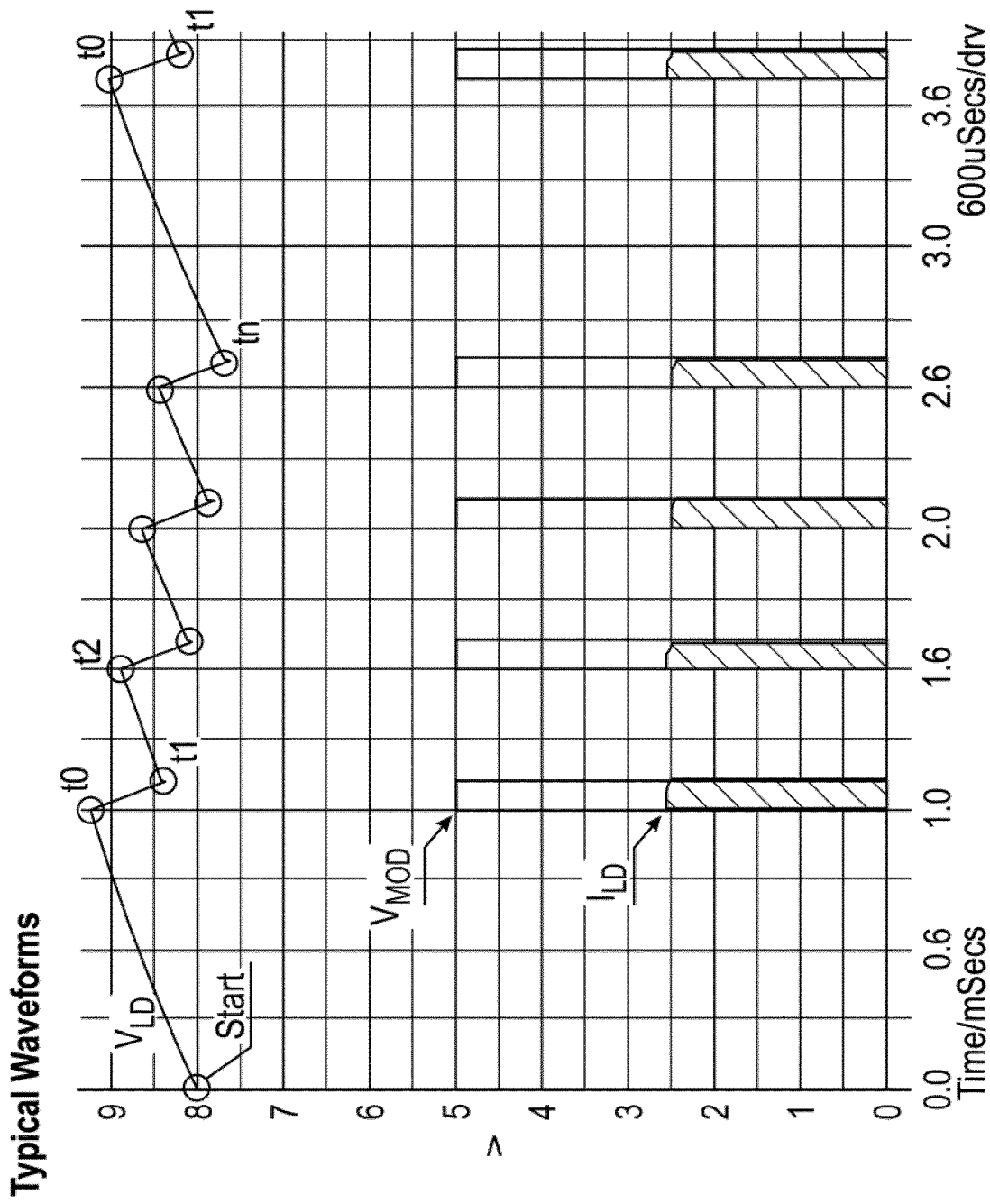
FIG. 9: A conceptual diagram of typical waveforms for the equivalent circuit of FIG. 8.

FIG. 9 shows a conceptual diagram of examples of waveforms for the equivalent circuit of FIG. 8. In FIG. 9, the waveforms show an illustrative example of how the capacitor ($C_{LD}$ 413) charges and discharges over time, such as when the VCSEL/EEL is driven with a 200 MHz modulation frequency in bursts of 100 microseconds repeated every 500 microseconds. This particular example shows a continuous wave (CW) implementation for the system.

FIG. 9 shows an example in which the capacitor node voltage $V_{LD}$ in the top trace decreases over time, showing an example in which $V_{LD}$ is not able to be fully recharged during the laser driver modulation pauses. The waveform $I_{LD}$ represents the average current delivered to the VCSEL/Laser, which, in FIG. 9, shows a slight droop at the end of an illumination period, which droop should be reduced or minimized by the circuit implementation, if possible.

The capacitor voltage waveform shows sampling points t0, t1, . . . , tn, etc. at which the capacitor node voltage $V_{LD}$ can be measured, such as to monitor capacitor discharge or to estimate the energy delivery capability.

Figure 10:
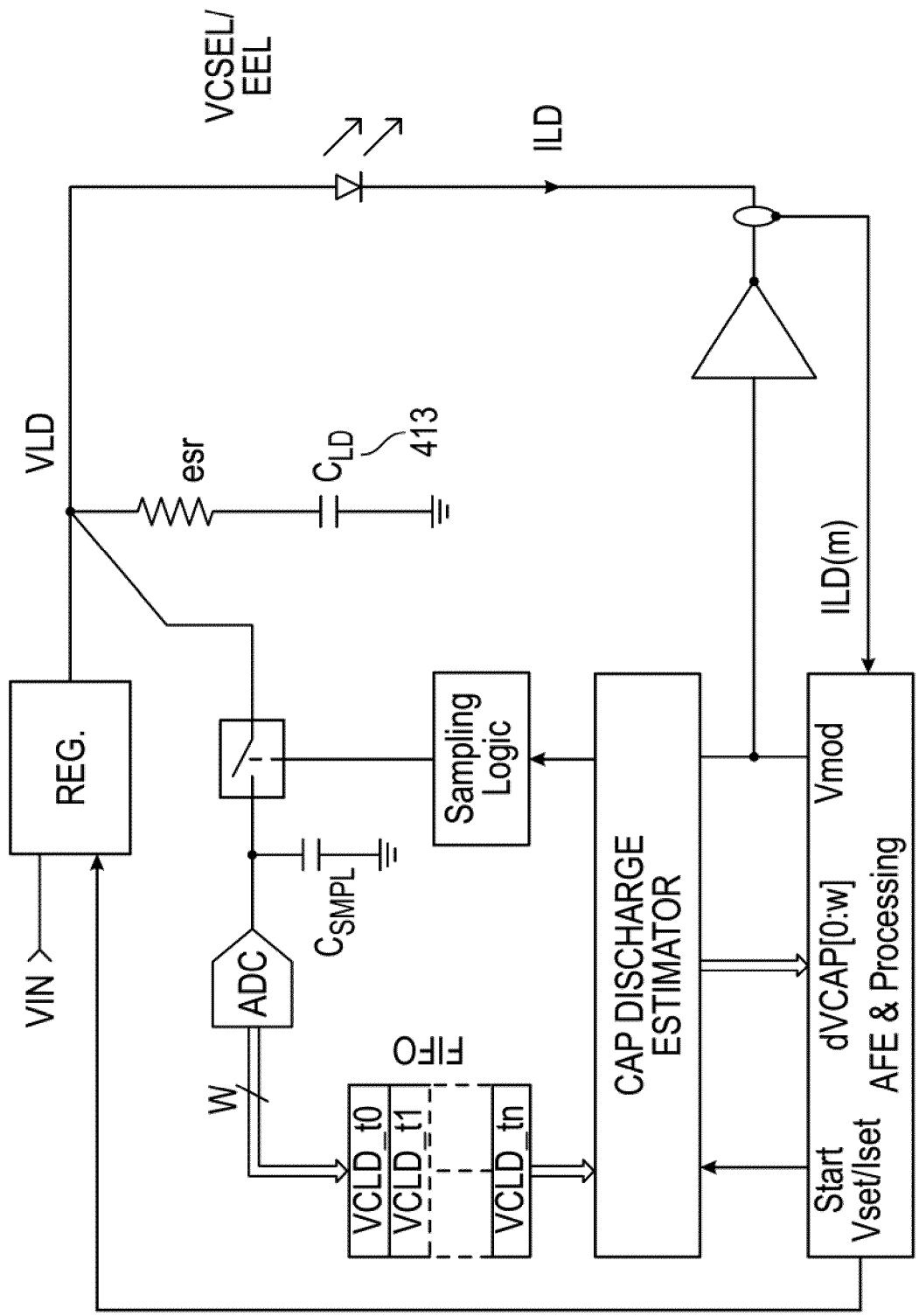
FIG. 10: An example of a mixed-signal circuit implementation for the system.

FIG. 10 shows an example of a mixed-signal circuit implementation. There are many other possible implementations, for example, using constant current or frequency injection. In the example of FIG. 10, the capacitor voltage $V_{LD}$ can be sampled, such as at t0, t1, . . . , tn, and converted by an analog-to-digital converter (ADC) of appropriate resolution, 'w', and the converted digital value can be stored, such as in a First In First Out (FIFO) register or bank of registers. Sampling times can be defined to sense the start and end of a capacitor $C_{LD}$ 413 discharge cycle.

In FIG. 10, at the end of a monitoring cycle (initiated by Start in FIG. 9) the sampled data can be processed by the "CAP DISCHARGE ESTIMATOR" circuit block, which can extract the actual capacitance value of the capacitor CLD 413 based on the following relationship: $C_{LD}*dV_{LD}=i_{LD}*dt=Q_{LD}$. The Laser current '$I_{LD}$' can be set and measured, such as by the Analog Front End (AFE) & Processing circuit, such as to permit calculation of delivered energy or charge ($Q_{LD}$) and the capacitance value of $C_{LD}$ 413.

After the $C_{LD}$ 413 capacitance value calculation, the AFE & Processing circuit block can adjust, if needed, a charging parameter for charging the capacitor $C_{LD}$ 413 and, if not enough energy can be provided, in the next activation cycle, can inform a host.

As previously mentioned, the parasitic elements of the bulk capacitor $C_{LD}$ 413 can impact estimated energy delivered to the VCSEL/EEL. In particular, the ESR of the bulk capacitor $C_{LD}$ 413 can impact energy delivery. As this ESR depends on the operating frequency and temperature (to a lesser degree), it can also change over time.

Figure 11:
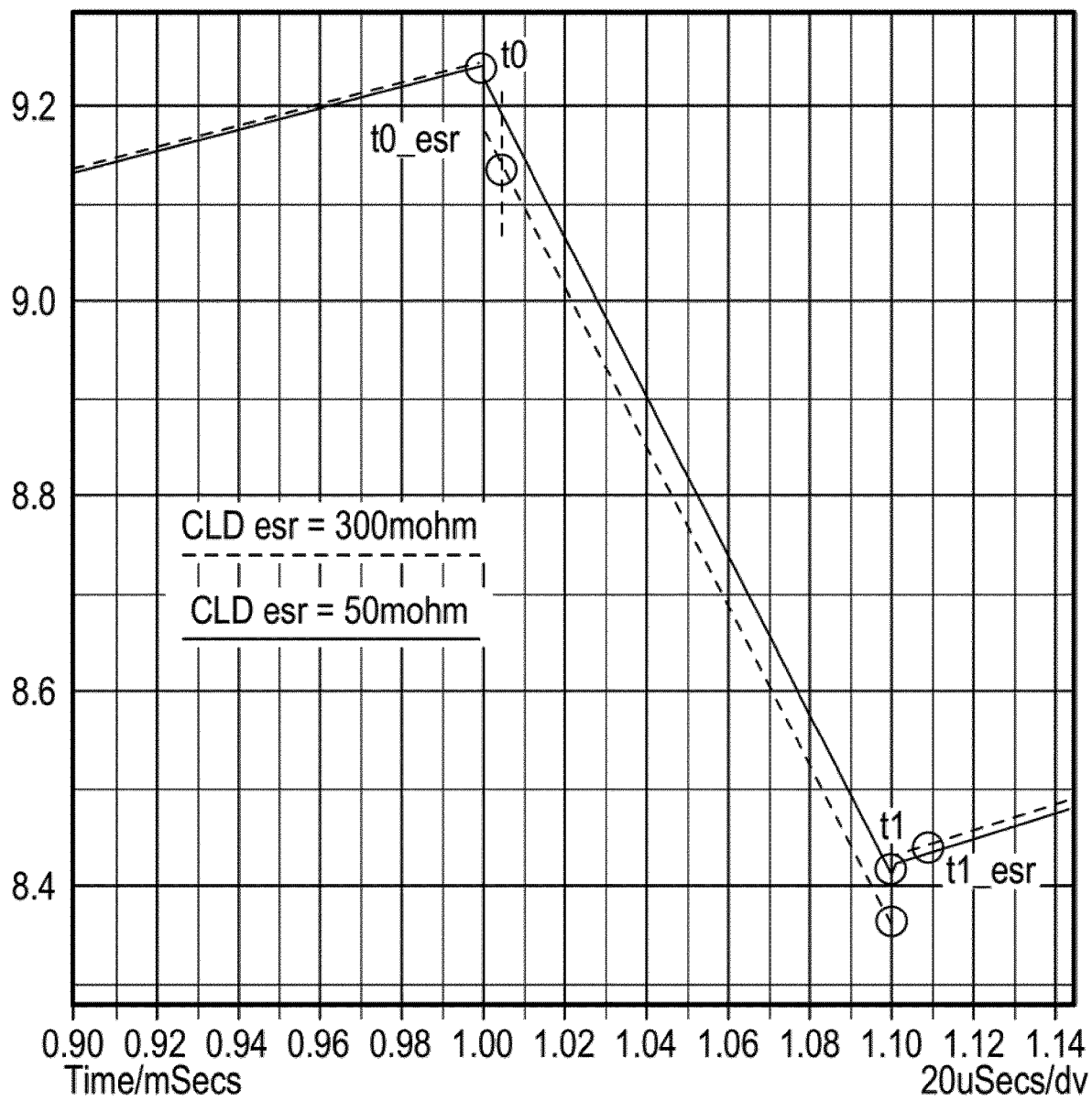
FIG. 11: An example of a computer simulation waveform.

FIG. 11 shows an example of a computer simulation waveform of the capacitor $C_{LD}$ 413 node voltage $V_{LD}$ vs. time, in which the ESR of the capacitor $C_{LD}$ 413 is changed from 50 milliohms to 300 milliohms. In FIG. 11, it can be noticed that there is a drop at the end of the discharge cycle, this drop is proportional to the current delivered to the laser.

In an example, additional sampling points can be added after t0 and t1, shown in FIG. 11 as t0_esr and t1_esr, at which it possible to quantify the change in ESR. This applies to subsequent discharge cycles as well. In some operating modes in which ESR is not expected to change quickly, it can be recurrently measured sparingly, such as can help reduce or minimize system overhead. Estimation of ESR can also be used to derive the current delivered to the laser source. Before the first use of the laser system the ESR can be estimated and used for calibration purposes to set what the initial current for running the laser source is when the system is powered on. The calibration can be done in a factory setting before the user is actively using the system.

Figure 12:
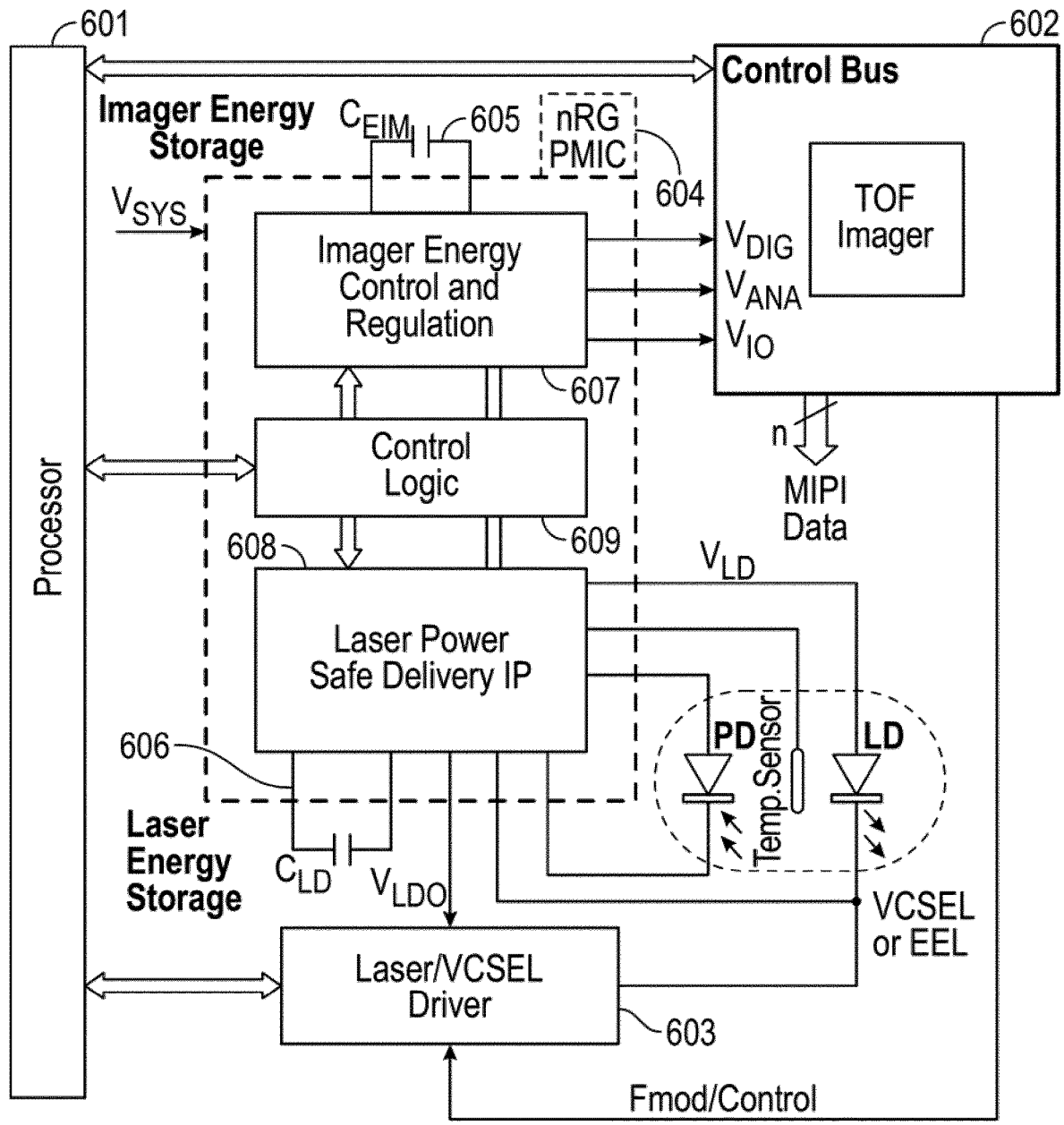
FIG. 12: An example of an imaging system.

FIG. 12 shows an example of how this can be extended to a complete imaging system, such as can include a TOF Imager, an illuminator, and power management.

In FIG. 12, an application processor 601 circuit can be configured for controlling the imaging system and programming the required operating parameters.

The ToF Imager 602 can be configured to control the activation of the illumination system 603 and can collect detected photons using a pixel array to perform ToF measurements. The Energy Management PMIC 604 can provide power supply rails for supplying power to both the Imager 602 and Illumination 603. Energy can be provided based on operating conditions, such as integration time, modulation frequency, and range, among others.

In FIG. 12, the Energy Management PMIC 604 can store energy for the imager, such as in the capacitor $C_{EIM}$ 605, and for illumination, such as in the capacitor $C_{LD}$ 606. This approach can allow the implementation of FIG. 12 to address different temporal energy needs between these two sub-systems, e.g., illumination and imaging. In certain examples, a particular tailored energy storage element may be useful to serve both imager and illumination sub-systems.

The Imager Energy Control and Regulation sub-block 607 can be programmed, such as for the specific mode of operation of the imager sub-system 602 and for the energy needed to support its operation. This sub-block can be configured to charge the energy storage element $C_{EIM}$ 605 to support the next operating cycle (e.g., such operating cycle can include an integration portion, a read-out portion, and a data transmission portion). The capacitor $C_{EIM}$ 605 may be fully or partially recharged such as during a pause between integrations and other operating phases.

In an example, the capacitor $C_{EIM}$ can supply an internal high-efficiency regulator such as can provide one or more regulated voltages to the imager. In FIG. 12, these regulated power supply rails can include $V_{DIG}$ (digital circuitry supply), $V_{AN}$ (analog circuitry supply), and $V_{IO}$ (Input/Output voltage reference). The number of regulated power supply rails may vary, depending on particular system needs.

The techniques described herein for the Bulk Capacitor Monitoring, including ESR considerations, are also similarly applicable to monitoring the imaging supply capacitor $C_{EIM}$. Because the power consumption in a ToF system can be drawn in recurrent impulses, the energy delivery approach described herein has the benefit of spreading the current over time, thus reducing the peak power consumption needs.

The regulators can include one or more of a low dropout (LDO) regulator or some other linear regulator, a switched-mode Step-Up or Boost voltage regulator, Step-Down or Buck voltage regulator, Buck-Boost voltage regulator, or a combination of these.

The illumination sub-block 608 can be programmed, such as for the specific mode of operation of the imager sub-system 602 and energy needed to support its operation. This illumination sub-block 608 can charge the energy storage element $C_{LD}$ 606, such as to support the next illumination cycle, such as described above. Prior to the laser burst the desired output voltage can be elevated slightly. This allows for the initial transient and allow the DC_DC converter time to respond. This reduces the need to have a large capacitor before the illumination sub-block. This can also be used for other sub-blocks that draw large amounts of power.

The control logic sub-block 609 can be configured to communicate with the application processor 601, such as to set the energy needed by the imager energy control 607 and illumination 608 sub-blocks. The control logic 609 can be configured to implement monitoring or diagnostics, such as can be used to protect the system or to report its status to the application processor 601.

Some uses might require that the end device be portable and there for ways to utilize space efficiently would be desirable. The power circuit implementation reduces in size compared to other conventional methods. Large input sources are not needed to power the device and a smaller footprint for building the TOF system can be achieved. Thereby this application can minimize the footprint of the device. There are multiple topology approaches that can be used. In some embodiments a large reservoir capacitor on the motherboard near the input can be used. Other implementations can use a more localized approach to keep the reservoir capacitor near the laser driver or the imager circuit. This can allow for optimization of a reservoir capacitor specifically for either the imager or the laser driver near the reservoir capacitor. This could improve problems that may be caused electromagnetic interference that may peak with high current on long return paths for the current.

Figure 15:
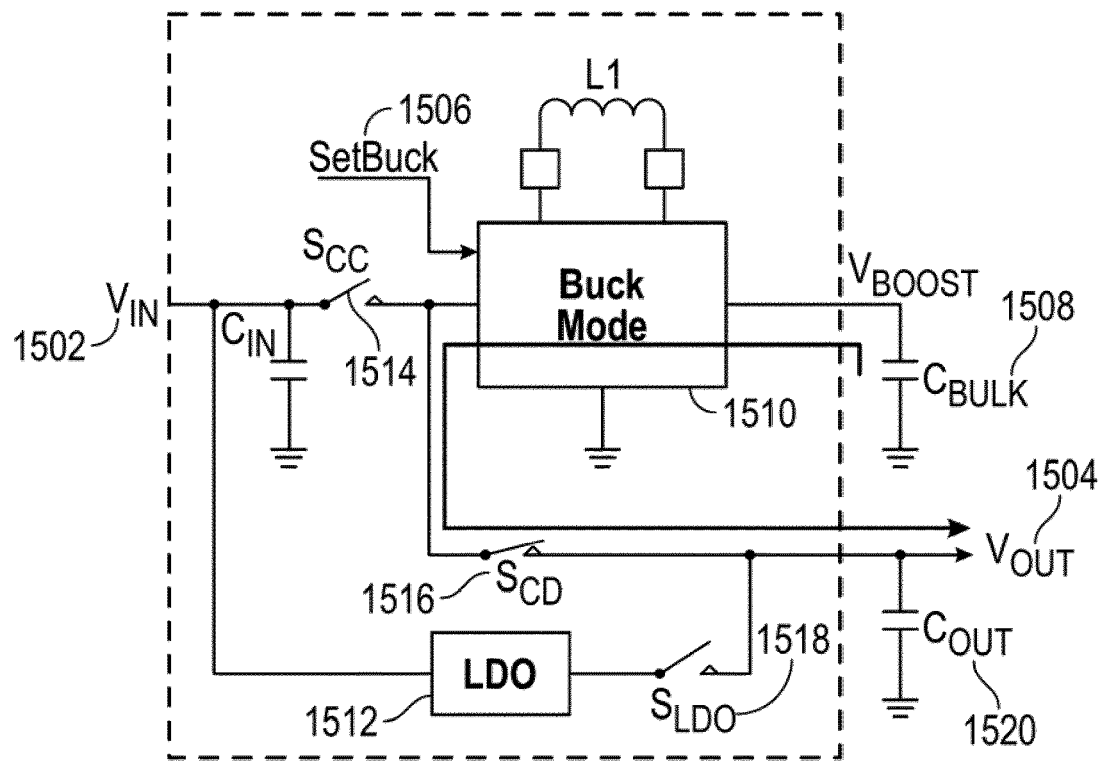
FIG. 15: Depicts the TOF system during the active phase.
Figure 16:
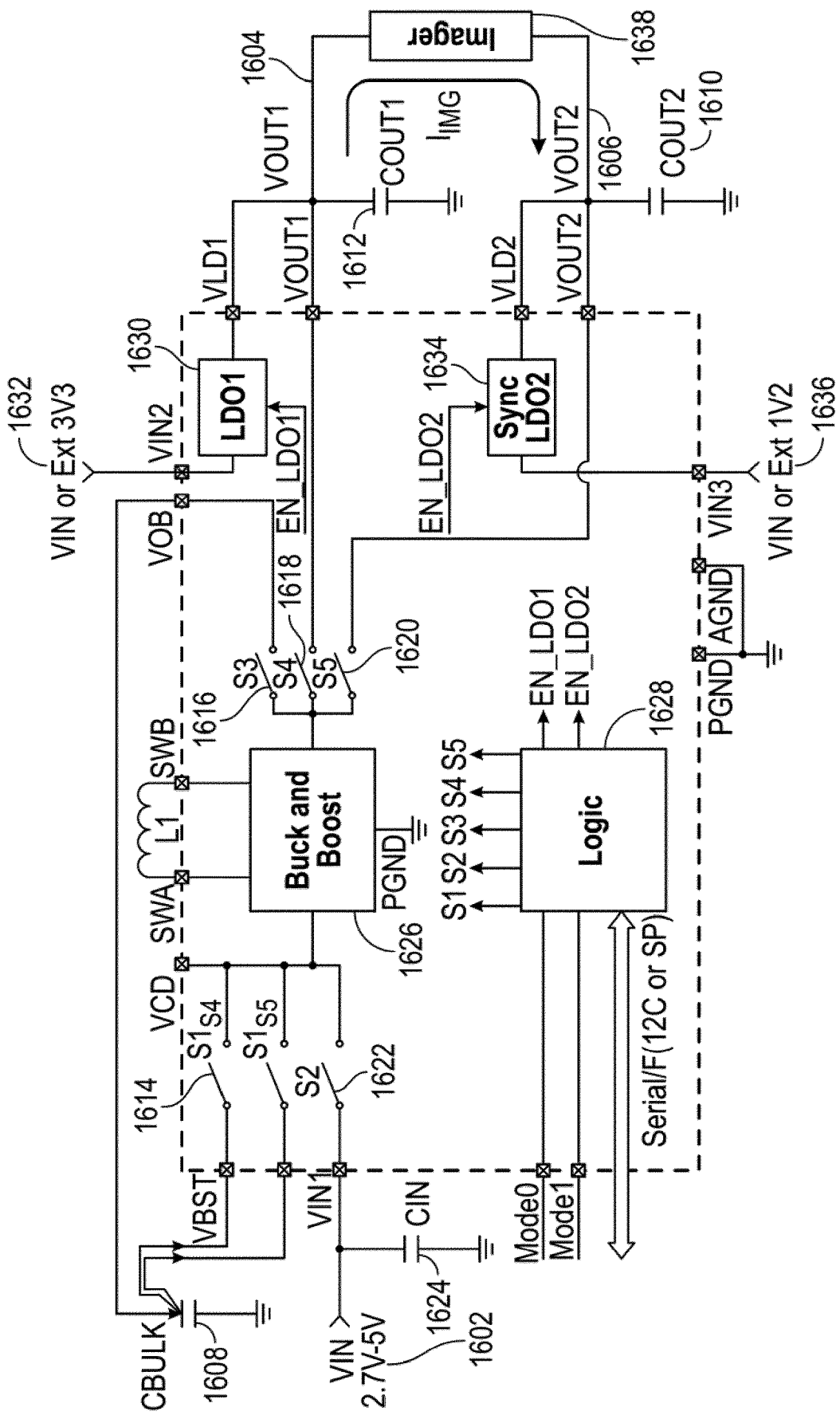
FIG. 16: A derivative implementation using a SIMO architecture in which two outputs are generated from the stored energy.
Figure 17:
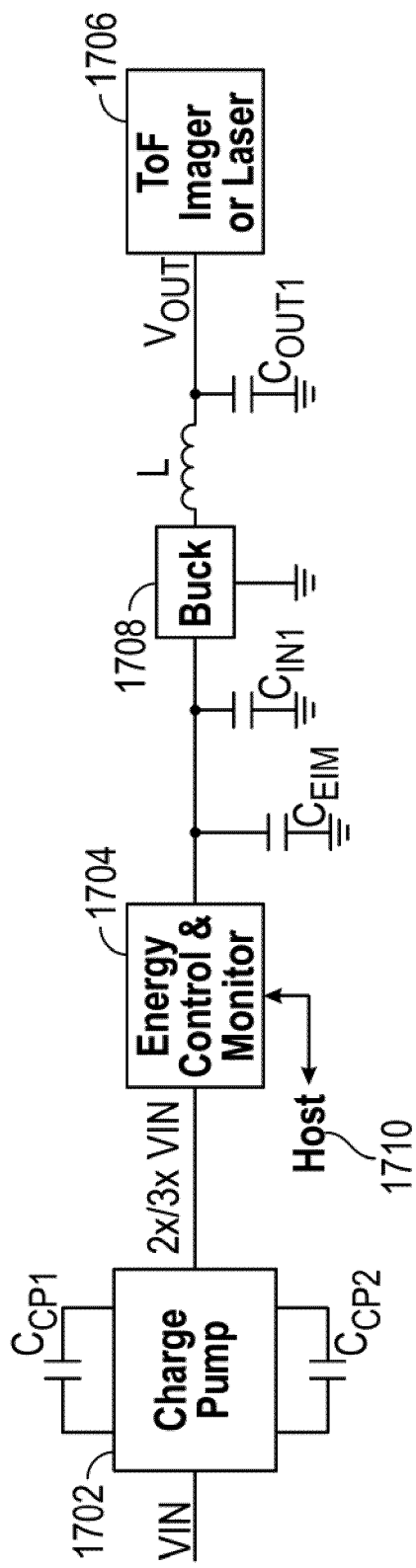
FIG. 17: Depicts the system using a charge pump.

The energy to operate such current impulsive system is provided by a reservoir capacitor, this section describes efficient and optimized power regulation architectures using a single switching regulator re-purposed according the operating state of the TOF system (as shown in FIGS. 13-16) or can be charge-pump 1702 followed by a switching regulator (as shown in FIG. 17). The charge-pump 1702 can be used in low power versions of the laser system. The use of the charge-pump allows for capacitive doubling, tripling, or other multiple increase.

Figure 13:
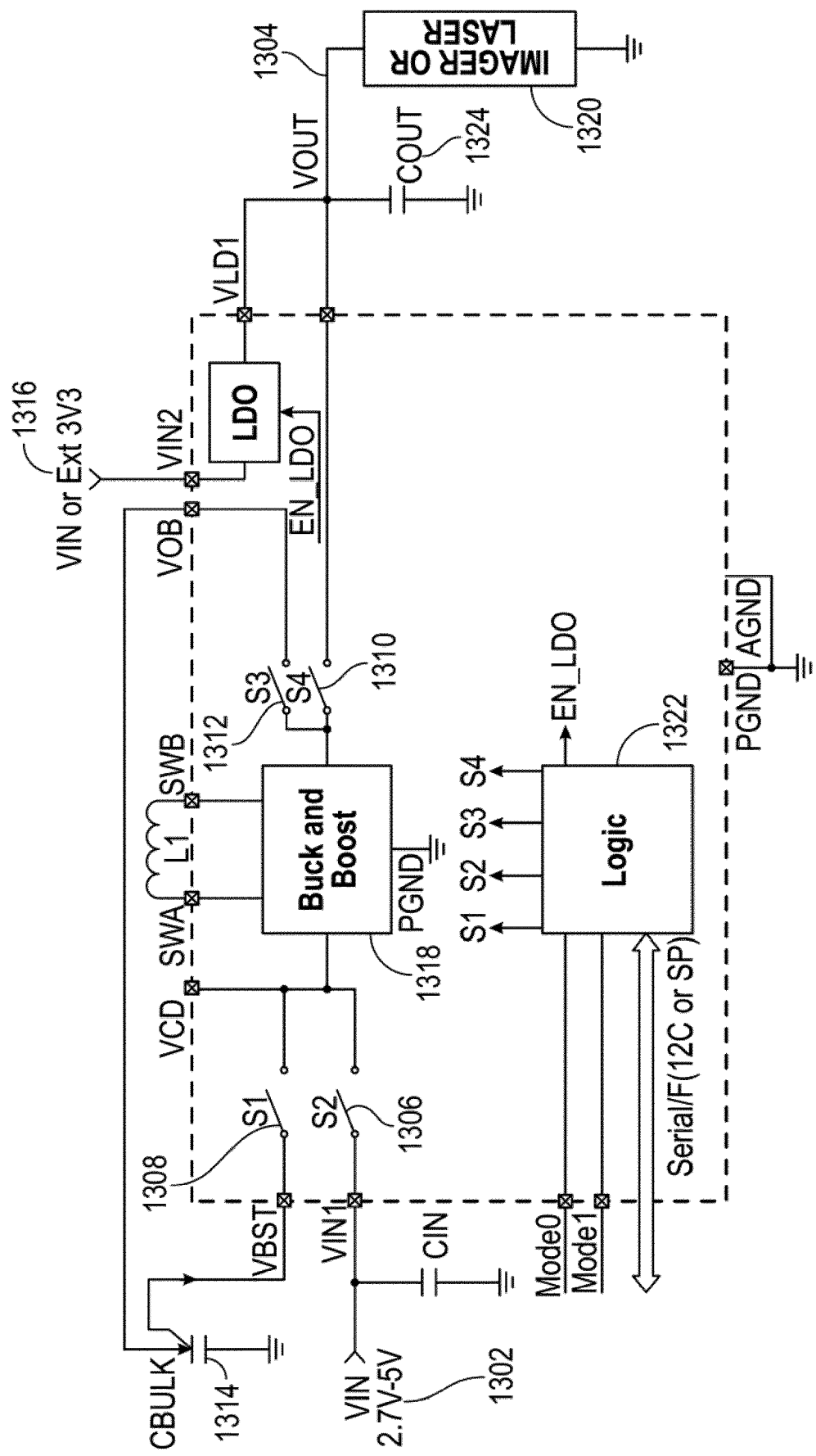
FIG. 13: An example implementation of the charging architecture.
Figure 14:
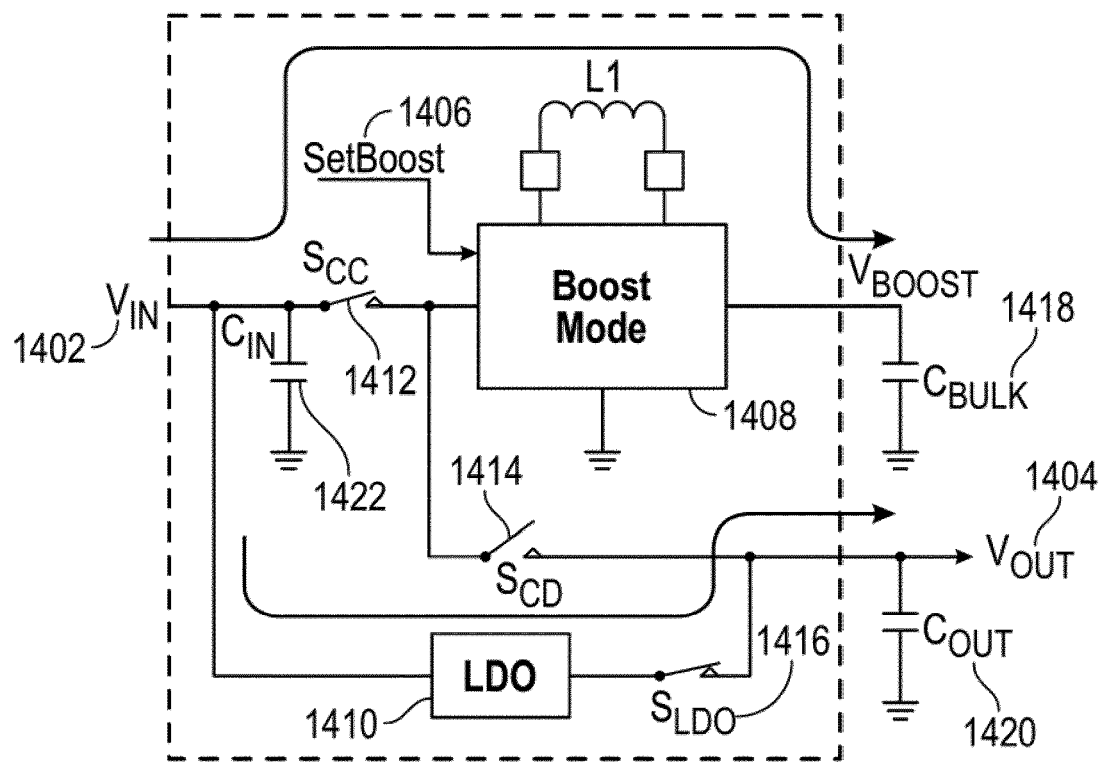
FIG. 14: Depicts the TOF system during the inactive phase.

FIG. 13 illustrates an example implementation of the charging architecture using a programable regulator 1318. This implementation is applicable to the illumination as well as the imaging sub-system. During the inactive phase, S2 1306 and S3 1312 are closed allowing the reservoir capacitor $C_{BULK}$ 1314 to be charged. Then during the active phase S1 1308 and S4 1310 are closed and the reservoir capacitor 1314 is depleted in order to either supplement the input power or to provide power to the system. Determining if the system is in an active phase or an inactive phase is determined by the system as it monitors the output of the laser source during the use of the laser. S1 1308 to S4 1310 are part of a Buck-Boost regulator 1318 switching scheme that can be re-purposed through a control logic to operate in the desired mode therefore considerably saving silicon real estate and using only one inductor. As shown in FIG. 14 and FIG. 15, the boost mode is used to charge the reservoir capacitor 1314 and the buck mode is used to discharge the reservoir capacitor 1314.

During the inactive phase of the TOF operation the power regulator is configured as a boost or buck-boost regulator charging the reservoir capacitor to his nominal level as shown in FIG. 14, the electric switch (FET, transistor, etc.) $S_{CC}$ 1412 is closed allowing the switching regulator to charge reservoir capacitor ($C_{BULK}$) 1418, the system-controlled signal 1406 "SetBoost" reprograms this switching regulator 1408 to operate as a boost. The electronic switch $S_{CC}$ 1412 is closed in order to charge the reservoir capacitor 1418. The switching regulator 1408 operating in boost mode may have a current limiting feature to avoid too much current be drawn from $V_{IN}$ 1402, switch $S_{CD}$ 1414 is open to disconnect the regulator from $V_{OUT}$ 1404. This the system current consumption is low in this case as $V_{OUT}$ 1404 can is maintained by an LDO or linear voltage regulator 1410 by closing the electronic switch $S_{LDO}$ 1414.

FIG. 15 depicts the TOF system during the active phase. The system first determines that more power to the system is needed than is currently being provided and switches the control signal of the switching regulator 1510 at a time before the power is actually needed by the system. The switching regulator 1510 is repurposed by setting the system-controlled signal 1506 to "SetBuck". This sets the switching regulator 1510 to buck mode. The system-control signal 1506 is asserted in advance of an upcoming current transient to "prepare" the regulator and avoid large voltage drops in the system. In this mode of operation, the input power is provided by $C_{BULK}$ 1508, the electronic switch $S_{CC}$ 1514 is open while $S_{CD}$ 1516 is closed allowing the buck to regulate $V_{OUT}$ 1504 and deliver the required energy to the load. $S_{LDO}$ 1518 can be set to open to disconnect the LDO 1512 from $V_{OUT}$ 1504, in certain cases the LDO 1512 can be kept connected providing additional energy in case the reservoir capacitor $C_{BULK}$ 1508 becomes depleted. The reservoir capacitor in some embodiments could be lower than the voltage to be delivered to the laser and the system is placed in boost mode to deliver the current required by the system.

FIG. 16 shows a derivative implementation using a SIMO architecture in which two outputs are generated from the same energy stored in $C_{BULK}$ 1608. Concurrently providing two outputs using one single inductor. The current load on $V_{OUT1}$ 1604 and $V_{OUT2}$ 1606 is similar and occur at the same time. The imager 1638 has a current that is sourced from $V_{OUT1}$ 1604 and sinking from $V_{OUT2}$ 1606. This implementation can be used in CW TOF systems. Such regulation circuit is suited to supply the power to the imager 1638. $V_{OUT2}$ 1606 can be used as a reference for the pixels in the imager. The pixels of the imager 1638 are biased to the same voltage.

Figure 19:
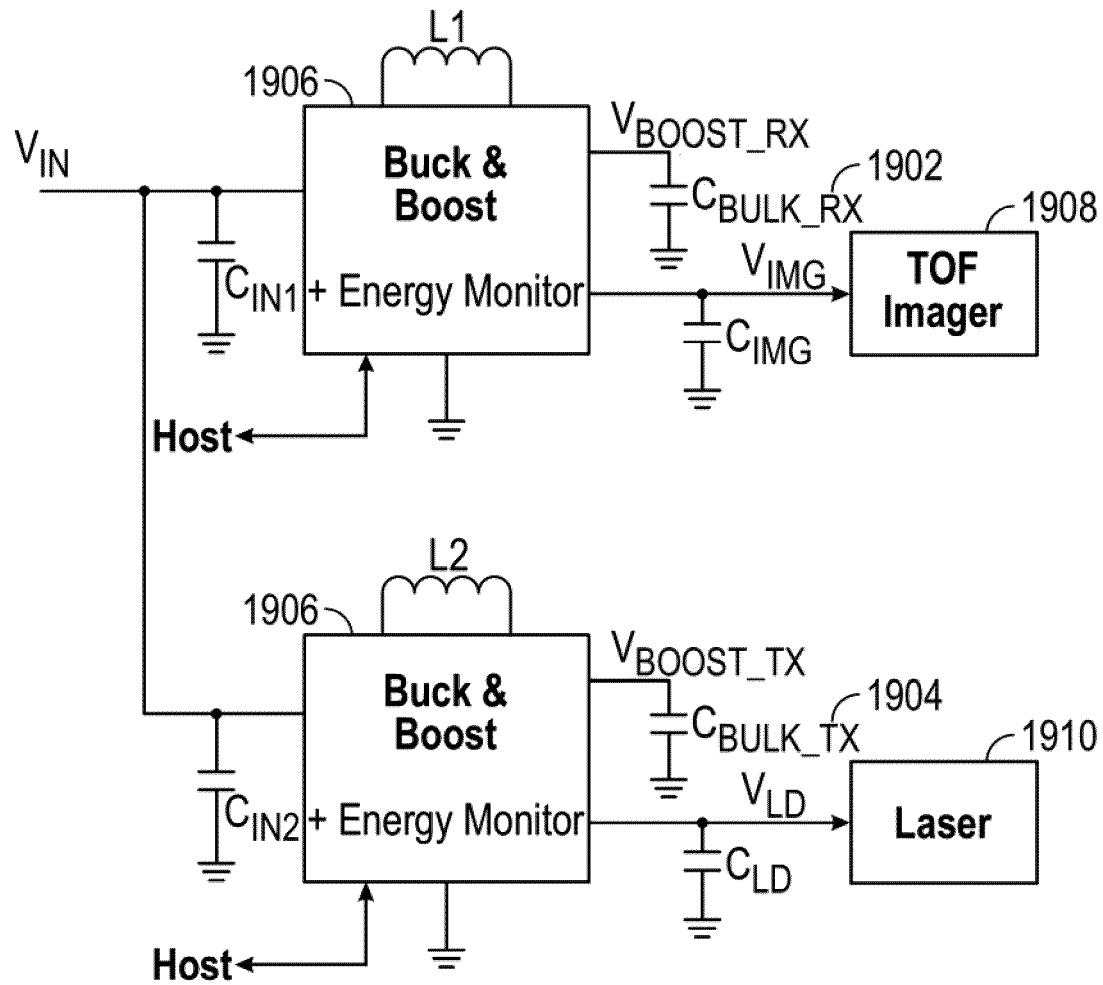
FIG. 19: Depicts an example implementation with a dedicated energy monitor and power regulation circuit as part of the system.

In cases where the power requirements are very different for the imager and laser circuits, it is preferable to have dedicated energy monitor and power regulation circuit as shown in FIG. 19, imager and laser circuits can be powered individually and have the associated bulk capacitor 1902 and 1904 sized and monitored for the respective power requirements. Using the combined buck and boost architecture of FIG. 19, as previously discussed, can greatly minimize the number of components and implementation footprint. Useful for systems with multiple laser drivers 1910 or imager circuits 1908.

Figure 18:
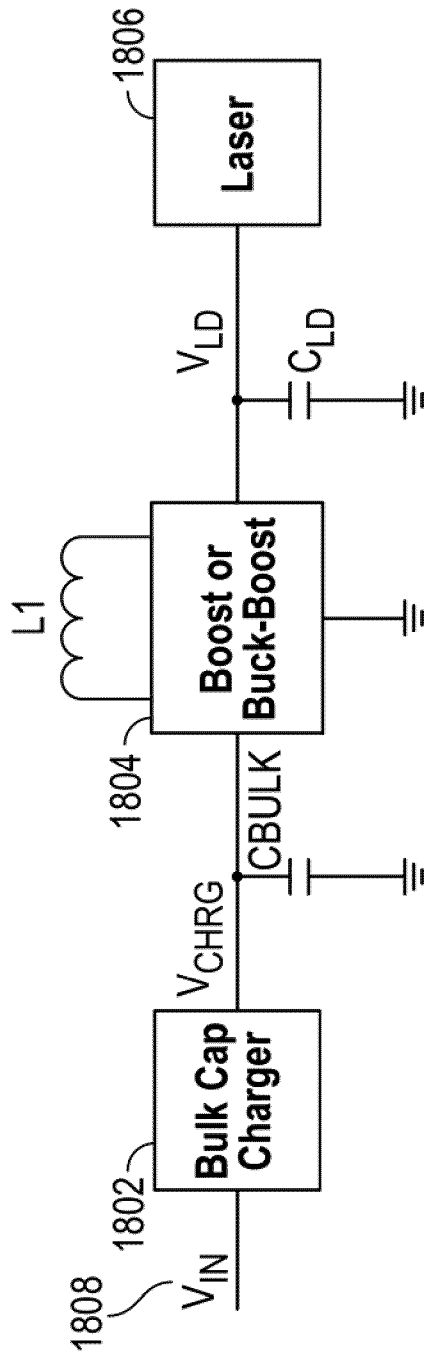
FIG. 18: Depicts an alternative buck and boost architecture.

FIG. 18 shows an alternative approach of the buck and boost architecture, in this case the bulk capacitor is charged, with a pre-set current, from a low voltage source (E.G. single-cell Li-Ion battery), when the imaging system requires to deliver energy, it will issue the control signal "Active" moments before the energy is required, this allows the boost or buck-boost regulator to prepare for the transient, for example by voltage positioning method. When this circuit is used to supply the anode of the EEL or VCSEL (i.e. the laser 1806), the output voltage $V_{LD}$ can be turned off at the end of the energy activation to save power or the boost or buck-boost can be kept active in a hysteretic mode to minimize quiescent current. One advantage of this implementation to use capacitors with lower rated voltage to improve reliability, such as using polymer capacitors, or minimize the decrease of capacitance with the applied voltage by using ceramic surface mounted capacitors.

Other applications can also take advantage of such implementation.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A device for managing power of a laser source in a laser-based apparatus, the device comprising:
    switched-mode power controller circuitry, including a controller output configured to be coupled to a reservoir capacitor of a laser source to provide a first mode of regulating charging of the reservoir capacitor between illuminations of the laser source and a second mode of regulating charging of the reservoir capacitor during illuminations of the laser source, wherein the switched-mode power controller circuitry can be either inductive or capacitive; and
    power controller circuitry is configured to provide power for at least one of the laser source and an imager circuit based at least in part on a discharge characteristic of the reservoir capacitor during illumination by the laser source, using at least one inductive power regulator, or a continuous-time linear voltage regulator, a single or dual inductor power regulator,
    wherein the power controller circuitry is configured to regulate charging and discharging of the reservoir capacitor based at least in part on an estimation of optical power, the estimation being derived from at least one of: a photodetector signal, a measured forward voltage of a laser emitter, or a measured temperature of the laser emitter.

2. The device of claim 1, wherein the power controller circuitry is configured to adjust the charging and discharging of the reservoir capacitor before a next illumination based on a detection of a fault indication.

3. The device of claim 2, wherein the fault indication is determined by a photosensor optically coupled to the laser source or a temperature sensor to determine the charging or discharging of the reservoir capacitor to maintain the power to either the laser source or imager circuitry.

4. The device of claim 1, wherein the power controller circuitry is further configured so that a second regulator of the at least one inductive power regulator is a linear regulator, that provides a minimum amount of power to the imager circuit or the laser source.

5. The device of claim 1, where a voltage regulator for charging the reservoir capacitor is also used for discharging power from the reservoir capacitor and delivering power to a laser source or other coupled circuitry.

6. The device of claim 5, wherein a characteristic of at least one reservoir capacitor is used to provide a fuel gauge indication for the reservoir capacitor.

7. The device of claim 1, wherein the power controller circuitry is configured to provide differently specifiable energy outputs respectively to the imager circuit and the laser source.

8. The device of claim 7, wherein the power controller circuitry is further configured to regulate charging of the reservoir capacitor, including in a first mode between illuminations by the laser source, based on monitoring at least one of a parasitic resistance of the reservoir capacitor or a parasitic inductance of the reservoir capacitor.

9. The device of claim 1, wherein an illumination monitor further includes a photodetector that is optically coupled to the laser source to transduce illumination light provided by the laser source before interaction with a target object or scene, and wherein the illumination is further based at least in part on an indication of the illumination light transduced by the photodetector.

10. The device of claim 1, wherein the power controller circuitry is configured to regulate charging and discharging of the reservoir capacitor based at least in part on an estimation of optical power, the estimation being derived from the measured temperature of the laser emitter.

11. The device of claim 1, wherein a charge pump is used to charge the reservoir capacitor and a buck switching voltage regulator is used to discharge the reservoir capacitor.

12. The device of claim 1, wherein the power controller circuitry comprises a shared switched-mode regulator to both (1) regulate charging of the reservoir capacitor, and (2) provide power to an imager circuit for collecting response light to the illuminations, wherein the power controller circuitry controls activation of the laser source based at least in part on an indication of response light collected by the imager circuit.

13. The device of claim 1, wherein the power controller circuitry is configured to regulate charging and discharging of the reservoir capacitor based at least in part on an estimation of optical power, the estimation being derived from the measured forward voltage of the laser emitter.

14. The device of claim 1, wherein the power controller circuitry is configured to regulate charging and discharging of the reservoir capacitor based at least in part on an estimation of optical power, the estimation being derived from the photodetector signal.

15. A method for managing power of a laser source in a laser-based apparatus, the method comprising:
   charging a reservoir capacitor in between illuminations of a laser source of the laser-based apparatus using a switched-mode voltage regulator and controlling an output of the switched-mode voltage regulator;
   discharging the reservoir capacitor during illumination by the laser source to supplement an increase of power needed to support the illumination out of the laser source; and
   regulating the charging and the discharging of the reservoir capacitor based at least in part on an estimation of optical power, the estimation being derived from at least one of: a photodetector signal, a measured forward voltage of a laser emitter, or a measured temperature of the laser emitter.

16. The method of claim 15, where an indication of charging and discharging of the reservoir capacitor is monitored by using measurement sensors to measure an indication of energy delivered to the laser source, imager circuitry or other coupled circuitry and charging and discharging of the reservoir capacitor is limited based on this indication.

17. The method of claim 16, wherein the power delivered by the reservoir capacitor is differently specifiable energy outputs respectively to the imager circuitry and the laser source.

18. The method of claim 16, where different frequencies of operation can be stored and used to enable different transient and power responses for the imager circuitry or laser driver.

19. The method of claim 15, where prior to the illumination of the laser source, a desired output voltage is elevated using the reservoir capacitor.

20. The method of claim 15, where charging and discharging characteristics of a reservoir capacitor are controlled by collecting response light to the illuminations, wherein a power controller circuitry controls activation of the laser source based at least in part on an indication of response light collected by an imager circuit or a photodetector.

21. A device for managing power of a laser source in a laser-based apparatus, the device comprising:
   means for charging a reservoir capacitor in between illuminations of a laser source of the laser-based apparatus and controlling its output; and
   means for discharging the reservoir capacitor during illumination by the laser source to supplement an increase of power needed to support the illumination out of the laser source; and
   means for regulating the charging and the discharging of the reservoir capacitor based at least in part on an estimation of optical power.

22. The device of claim 21, where prior to the illumination of the laser source, a desired output voltage is elevated using the reservoir capacitor.

* * * * *